Jan. 10, 1961  W. H. SMITH  2,967,978
POWER SUPPLY FAULT SENSING AND
PROTECTIVE CONTROL CIRCUIT
Filed April 28, 1958
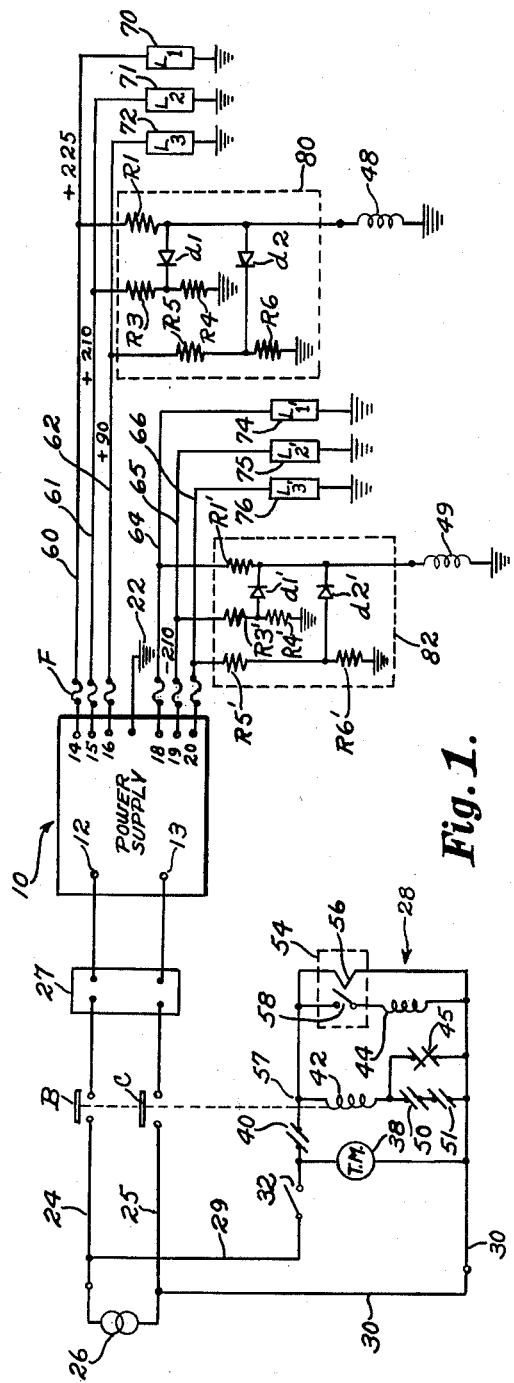
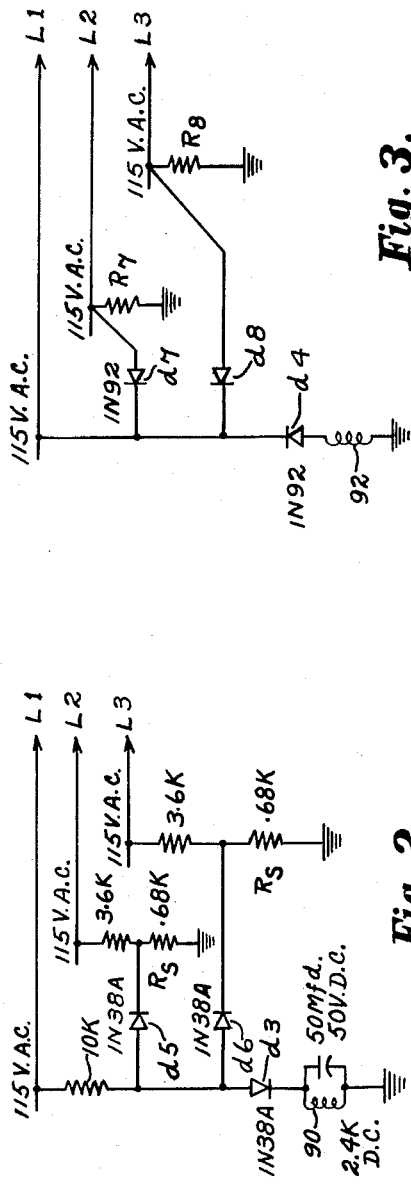
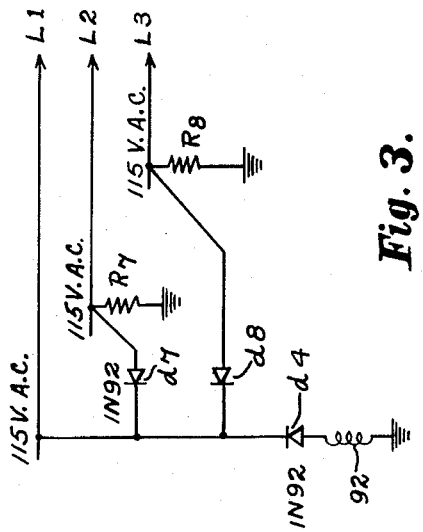
INVENTOR.
WILLIAM H. SMITH.
BY
ATTORNEY.

United States Patent Office

2,967,978
Patented Jan. 10, 1961

2,967,978

POWER SUPPLY FAULT SENSING AND PROTECTIVE CONTROL CIRCUIT

William H. Smith, St. Clair Shores, Mich., assignor to Burroughs Corporation, Detroit, Mich., a corporation of Michigan Filed Apr. 28, 1958, Ser. No. 731,260

6 Claims. (Cl. 317—46)

This invention relates to power supply protective control systems and more particularly to an improved internal-external fault sensing protective control circuit for sensing a loss or absence of voltage in any one of the output supply conductors of a multiple circuit voltage distribution system or power supply of the type furnishing a plurality of separately developed output voltages of the same or several different voltage levels to a plurality of different loads.

The invention has among its general objects to provide improvements in fault sensing control circuits for systems of the above character from the standpoint of decreasing the cost and power consumption and improving the reliability of the control system.

A specific object is to provide a fault sensing control circuit embodying principles of simple logical circuitry design for multiple output circuit power supplies and voltage distribution systems.

Another object is to provide an improved fault sensing control circuit which uses a minimum number of control relays therein.

Other objects together with the advantages and features attending the invention may be appreciated from a consideration of the following detailed description and drawings, wherein:

Fig. 1 is a schematic circuit diagram of the fault sensing and protective control circuit of the present invention as embodied in a multiple level D.C. power supply; and Figs. 2 and 3 are slightly modified versions of the fault sensing circuit for use in A.C. distribution networks.

In Fig. 1 of the drawings, 10 represents a D.C. power supply having a pair of A.C. input terminals 12, 13 and a plurality of output terminals 14, 15, 16 and 18, 19, 20, furnishing output voltages of different potential levels poled positively and negatively relative to ground, indicated at 22. The input terminals are connected over circuit mains 24, 25 to an A.C. power source 26 through a constant voltage power transformer 27, and a pair of interrupter contacts B, C operated or controlled from a power supply control system 28 which is shown in somewhat simplified form but is based on that shown in co-pending U.S. patent application S.N. 543,138 filed October 27, 1955, now U.S. Patent 2,839,709 issued June 17, 1958, of common ownership herewith.

The control system is shown connected to the A.C. mains over line conductors 29 and 30 and may include a manually operable key switch 32 connected in line conductor 29; a first circuit branch which includes a timing motor or relay 38 having a set of normally open contacts 40; a second circuit branch that is connected across the timing relay 38 and includes the normally open contacts 40 of the latter relay connected to one side of the power or circuit breaker relay 42, which is associated with the interrupter contacts B, C and has its other side returned to line conductor 30 over a pair of alternate circuit paths one of which paths includes a set of normally closed contacts 45 of a control relay 44 and the other path includes two serially connected sets of normally open contacts 50 and 51 of a pair of sensing relays 48 and 49, later to be described; and a third circuit branch which includes a thermal delay relay device 54 having a thermal element 56, which is connected to circuit point 57 and to the return circuit conductor 30, and a set of normally open contacts 58 one side of which is connected to the circuit point 57 and the other side to one side of the aforementioned control relay 44 returned to line conductor 30, as shown.

The output terminals of the power supply are connected over individual output supply conductors or buses 60, 61, 62 and 64, 65 and 66 to separate load circuits indicated at 70, 71, 72 and 74, 75 and 76, and may be individually fused externally of the power supply as shown at F. Alternatively, the fuses may be located interiorly of the power supply in the respective rectified output section thereof, as in the patent application referenced above.

In order to protect the power supply against undesirable effects and harm resulting from a loss of voltage condition or failure of its output voltages to come on or rise to their rated levels, the invention provides for each set of positive and negative supply conductors a fault sensing and protective control circuit in the form of a logical AND circuit, also called a coincidence circuit, shown as a diode gate 80, 82, and the aforementioned voltage responsive sensing relays 48, 49, the contacts 50, 51 of which are connected in the input control circuit as shown. Each gate circuit includes a dropping resistor R1, R1', shown connected to the highest voltage level output supply conductor 60, 64, and to the ungrounded side of the sensing relay 48, 49 associated with the gate circuit; a voltage divider network R3, R4; R3', R4' and R5, R6; R5', R6' for each of the remaining output supply conductors; and individual diodes d1, d1' and d2, d2' each connected to the junction or dividing point of a different one of the divider networks and to the ungrounded side of the sensing relays 48, 49, and poled as shown.

The resistance values of the dropping resistor R1, R1' and the voltage divider networks are chosen with respect to the nominal pull-in voltage of the particular relay selected for the sensing function, so that under normal operating conditions the voltage drop across each of the separate divider resistors R4, R4' and R6, R6'; will be approximately equal to the voltage drop across the sensing relay. The total resistance of the grounded divider resistor and the forward resistance of the diode associated therewith ought preferably to be less than the coil resistance of the sensing relay to divert sufficient current from and reduce the current flow through the sensing relay below the minimum hold-in value thereof. While this resistance value may vary somewhat depending upon the coil characteristics of the particular sensing relay employed, for practical operating purposes, the total resistance may be one-third or less the coil resistance. With a 14.5 volt, 6 ms., Sigma type relay having a D.C. coil resistance of 2400 or 2.4K ohms a multiple output power supply furnishing separately developed positive and negative operating voltages of 225, 210 and 90 volts, typical values for the several resistances are listed below:

| | |
|---|---|
| R1, R1' | 36K |
| R3, R3' | 8.2K |
| R4, R4' | 0.62K |
| R5, R5' | 3.6K |
| R6, R6' | 0.68K |

Due to the negligible forward current and the relatively slow switching time requirements, the choice of the diode is dictated by the magnitude of the voltage appearing across the sensing relay, which voltage should be less than the peak inverse rating of the diode selected.

The power supply is placed in operating condition by closing the key switch 32 to energize and start the time cycle of the timing motor relay 38. After a predetermined time, the relay 38 closes its contacts 40 to energize the breaker contact controlling power relay 42 through the normally closed contacts 45 of the de-energized control relay 44 and to supply heating current to the thermal element 56 of the thermal delay relay. Energization of the power relay 42 closes the breaker contacts B, C to supply power to the several transformer supplied rectifier circuits included within the power supply from which rectified output voltages are delivered to the output supply terminals. Upon the expiration of the time cycle of the thermal delay relay 54, the switch contacts 53 thereof close to energize the control relay 44, which opens its normally closed contacts 45 to transfer the control and the continued energization of the power relay 42 to the contacts 50, 51 of the sensing relays 48 and 49.

Under normal operating conditions, the sensing relays 48, 49 become energized within the time cycle of the thermal relay 54, during which time the output voltages of the power supply will have attained their designated operating levels. In the event of a D.C. failure, or failure of the power supply output voltages to come on or to attain their rated levels during the on-cycle of the control system, the grounded divider resistors R4, R6 effectively shunt the coils of their associated sensing relays 48, 49, and divert a sufficient amount of current therefrom through the diodes to drop out the relay, or prevent it from pulling in, and drop out the power relay 42. Loss of voltage to either or both of the positive and negative load circuits sensed by the resistors R1, R1' drop out their respective sensing relays which open their contacts 50 and 51 in the control circuit 28 to de-energize the power relay 42 and open the breaker contacts B, C to interrupt the input voltage supply to the power supply.

It may be preferred to incorporate the voltage dividers as part of the bleeder resistor networks of the power supply in order to avoid duplication of the resistors. While the operating voltages for the voltage responsive relays 48, 49 are shown as being derived from the highest voltage level output supply circuits, these voltages could also be derived from any of the output supply circuits having a voltage level at least equal to the hold-in operating value of the sensing relay, the resistive values of the divider networks being selected to achieve a common operating value for the coil of the particular sensing relay employed.

Figs. 2 and 3 are modified versions of the gated sensing circuit to permit sensing of A.C. voltages for use in A.C. distribution networks, etc. Two types of circuit configuration are illustrated to utilize a 115 volt D.C. relay 90 and 115 volt A.C. relay 92 in Figs. 2 and 3, respectively.

Circuit operation is accomplished by rectification of the coil current by a diode $d3$, $d4$, and connecting the input lines through the diodes $d5$ and $d6$ of Fig. 2 to the division points of the divider networks of Fig. 2, or connecting the diodes $d7$, and $d8$ to the high potential or ungrounded side of the shunting resistors R7, R8 of Fig. 3, to form the required gate, or logical AND circuit, as indicated.

Where different A.C. voltage levels are encountered, as in Fig. 1, resistive voltage dividers may be employed to achieve a common coil operating value.

As with the D.C. sensing circuit, the resistance values of the individual resistors shunting the relay coil should be one-third or less the value of coil resistance, depending somewhat on the coil characteristics while in the configuration of Fig. 3, with undivided input levels, the coil resistance should be as high as possible to permit the use of high values of shunt resistors R7 and R8 to decrease power consumption.

All diode polarities may be reversed, if desired, in the configurations of Figs. 2 and 3.

What is claimed is:

1. In a power supply system for supplying a plurality of separately developed output voltages of different voltage levels over a plurality of different supply conductors to a plurality of different load circuits from a source of electrical power connected to the input of the power supply, an internal-external fault sensing and protective control circuit for said power supply comprising voltage responsive control means, switching means controlled by said voltage responsive control means and connected in the input of the power supply, and a diode gate control circuit for said voltage responsive control means including a first circuit path connected to one of said output supply conductors and said voltage responsive control means, a separate voltage divider network provided for and connected to each of the remaining output supply conductors, and a separate diode connected between the division point of a different one of the voltage divider networks and to the first circuit path and poled to divert current flow supplied to the voltage responsive control means from the first circuit path through a portion of a divider network in the event of a failure of voltage to the load circuit supplied from the output supply conductor to which that divider network is connected.

2. In a power supply system for supplying a plurality of separately developed output voltages of different voltage levels over a plurality of different supply conductors to a plurality of different load circuits from a source of electrical power connected to the input of the power supply, an internal-external fault sensing and protective control circuit for said power supply comprising voltage responsive control means, switching means controlled by said voltage responsive control means and connected in the input of the power supply, and a diode gate control circuit for said voltage responsive control means including a first circuit path connected to the output supply conductor of the highest potential level and to said voltage responsive control means, a separate voltage divider network provided for and connected to each of the remaining output supply conductors, and a separate diode connected between the division point of a different one of the voltage divider networks and to the first circuit path and poled to divert current flow supplied to the voltage responsive control means from the first circuit path through a portion of a divider network in the event of a failure of voltage to the load circuit supplied from the output supply conductor to which that divider network is connected.

3. Apparatus in accordance with claim 2 above wherein the resistance of that portion of each voltage dividing network shunting the voltage responsive control means is approximately one-third of the effective resistance of the voltage responsive control means.

4. In a power supply system for supplying a plurality of separately developed output voltages over a plurality of different supply conductors to a plurality of different load circuits from a source of electrical power connected to the input of the power supply, an internal-external fault sensing and protective control circuit for said power supply comprising voltage responsive control means, switching means controlled by said voltage responsive control means and connected in the input of the power supply, and a diode gate control circuit for said voltage responsive control means including a first circuit path having a resistance therein connected to one of said output supply conductors and to said voltage responsive control means, a separate voltage divider network provided for and connected to each of the remaining output supply conductors, and a separate diode connected between the division point of a different one of the voltage divider networks and to the connection point between said resistance and the voltage responsive control means and poled to divert current flow supplied to the voltage responsive control means from the first circuit path through a portion of a divider network in the event of a failure of voltage to the load circuit supplied from the output supply conductor to which that divider network is connected.

5. Apparatus in accordance with claim 4 above wherein the resistance of that portion of each voltage dividing network shunting the voltage responsive control means is approximately one-third of the effective resistance of the voltage responsive control means.

6. In a power supply system for supplying a plurality of separately developed output voltages over a plurality of supply conductors to a plurality of different load circuits from a source of electrical power connected to the input of the power supply, an internal-external fault sensing and protective control circuit for said power supply comprising voltage responsive control means, switch means controlled by said voltage responsive control means and connected in the input of the power supply, a first circuit path connected to one of the output supply conductors and to said voltage responsive control means, a separate circuit path for each of the remaining supply conductors each including separate resistance means therein, and a separate unidirectional current flow directing element for each separate current path connected to the resistive means thereof and to said voltage responsive control means and poled to divert current supplied to said voltage responsive control means over said first circuit path through the resistive means in the event of a voltage failure of the load circuit supplied from the output conductor to which that resistive means is connected.

References Cited in the file of this patent

UNITED STATES PATENTS

| | | |
|---|---|---|
| 1,312,454 | Raney | Aug. 5, 1919 |
| 1,498,695 | Raney | June 24, 1924 |
| 2,548,625 | Seely | Apr. 10, 1951 |
| 2,807,771 | Winograd | Sept. 24, 1957 |
| 2,839,709 | Baumgartner | June 17, 1958 |